United States Patent
Divakaran et al.

(10) Patent No.: US 6,763,069 B1
(45) Date of Patent: Jul. 13, 2004

(54) EXTRACTION OF HIGH-LEVEL FEATURES FROM LOW-LEVEL FEATURES OF MULTIMEDIA CONTENT

(75) Inventors: Ajay Divakaran, Scotch Plains, NJ (US); Anthony Vetro, Staten Island, NY (US); Huifang Sun, Cranbury, NJ (US); Peng Xu, New York, NY (US); Shih-Fu Chang, New York, NY (US)

(73) Assignee: Mitsubishi Electric Research Laboratories, Inc, Cambridge, MA (US)

( * ) Notice: Subject to any disclaimer, the term of this patent is extended or adjusted under 35 U.S.C. 154(b) by 760 days.

(21) Appl. No.: 09/610,763

(22) Filed: Jul. 6, 2000

(51) Int. Cl.[7] .............................. H04N 7/12; G06K 9/36
(52) U.S. Cl. ................ 375/240.08; 382/243; 348/397.1
(58) Field of Search ........................ 375/240.08, 240.23, 375/240.24, 240.26, 240.1; 348/397.1, 399.1, 417.1, 422.1; 382/242, 243, 236, 268, 266, 217, 173; 707/101; 709/217; 345/723

(56) References Cited

U.S. PATENT DOCUMENTS

| | | | | |
|---|---|---|---|---|
| 5,802,361 A | * | 9/1998 | Wang et al. | 382/217 |
| 6,079,566 A | * | 6/2000 | Eleftheriadis et al. | 707/101 |
| 6,092,107 A | * | 7/2000 | Eleftheriadis et al. | 709/217 |
| 6,236,395 B1 | * | 5/2001 | Sezan et al. | 345/723 |
| 6,493,386 B1 | * | 12/2002 | Vetro et al. | 375/240.1 |
| 6,516,090 B1 | * | 2/2003 | Lennon et al. | 382/173 |

* cited by examiner

*Primary Examiner*—Gims Philippe
(74) *Attorney, Agent, or Firm*—Dirk Brinkman; Andrew J. Curtin

(57) ABSTRACT

A method extracts high-level features from a video including a sequence of frames. Low-level features are extracted from each frame of the video. Each frame of the video is labeled according to the extracted low-level features to generate sequences of labels. Each sequence of labels is associated with one of the extracted low-level feature. The sequences of labels are analyzed using learning machine learning techniques to extract high-level features of the video.

13 Claims, 2 Drawing Sheets

EXTRACTION OF HIGH-LEVEL FEATURES FROM LOW-LEVEL FEATURES OF MULTIMEDIA CONTENT

FIELD OF THE INVENTION

This invention relates generally to multimedia content, and more particularly to extracting high-level features from low-level features of the multimedia content.

BACKGROUND OF THE INVENTION

Video analysis can be defined as processing a video with the intention of understanding its content. The understanding can range from a "low-level" understanding, such as detecting shot boundaries in the video, to a "high-level" understanding, such as detecting a genre of the video. The low-level understanding can be achieved by analyzing low-level features, such as color, motion, texture, shape, and the like, to generate content descriptions. The content description can then be used to index the video.

The proposed MPEG-7 standard provides a framework for such content description. MPEG-7 is the most recent standardization effort taken on by the MPEG committee and is formally called "Multimedia Content Description Interface," see "MPEG-7 Context, Objectives and Technical Roadmap," ISO/IEC N2861, July 1999.

Essentially, this standard plans to incorporate a set of descriptors and description schemes that can be used to describe various types of multimedia content. The descriptor and description schemes are associated with the content itself and allow for fast and efficient searching of material that is of interest to a particular user. It is important to note that this standard is not meant to replace previous coding standards, rather, it builds on other standard representations, especially MPEG-4, because the multimedia content can be decomposed into different objects and each object can be assigned a unique set of descriptors. Also, the standard is independent of the format in which the content is stored.

The primary application of MPEG-7 is expected to be search and retrieval applications, see "MPEG-7 Applications," ISO/IEC N2861, July 1999. In a simple application environment, a user may specify some attributes of a particular video object. At this low-level of representation, these attributes may include descriptors that describe the texture, motion and shape of the particular video object. A method of representing and comparing shapes has been described in U.S. patent application Ser. No. 09/326,759 "Method for Ordering Image Spaces to Represent Object Shapes," filed on Jun. 4, 1999 by Lin et al., and a method for describing the motion activity has been described in U.S. patent application Ser. No. 09/406,444 "Activity Descriptor for Video Sequences" filed on Sep. 27, 1999 by Divakaran et al.

To obtain a high-level representation, one may consider more elaborate description schemes that combine several low-level descriptors. In fact, these description schemes may even contain other description schemes, see "MPEG-7 Multimedia Description Schemes WD (V1.0)," ISO/IEC N3113, December 1999 and U.S. patent application Ser. No. 09/385,169 "Method for representing and comparing multimedia content," filed Aug. 30, 1999 by Lin et al.

The descriptors and description schemes that will be provided by the MPEG-7 standard can be considered as either low-level syntactic or high-level semantic, where the syntactic information refers to physical and logical signal aspects of the content, and the semantic information refers to conceptual meanings of the content.

In the following, these high-level semantic features will sometimes also be referred to as "events."

For a video, the syntactic events may be related to the color, shape and motion of a particular video object. On the other hand, the semantic events generally refer to information that cannot be extracted from low-level descriptors, such as the time, name, or place of an event, e.g., the name of a person in the video.

However, automatic and semi-automatic extraction of high-level or semantic features such as video genre, event semantics, etc., is still an open topic for research. For instance, it is straightforward to extract the motion, color, shape, and texture from a video of a football event, and to establish low-level similarity with another football video based on the extracted low-level features. These techniques are well described. However, it is not straightforward to automatically identify the video as that of a football event from its low-level features.

A number of extraction techniques are known in the prior art, see for example, Chen et al., "ViBE: A New Paradigm for Video Database Browsing and Search Proc," IEEE Workshop on Content-Based Access of Image and Video Databases, 1998, Zhong et al., "Clustering Methods for Video Browsing and Annotation," SPIE Conference on Storage and Retrieval for Image and Video Databases, Vol. 2670, February, 1996, Kender et al., "Video Scene Segmentation via Continuous Video Coherence," In IEEE CVPR, 1998, Yeung et al., "Time-constrained Clustering for Segmentation of Video into Story Units," ICPR, Vol. C. August 1996, and Yeo et al, "," IEEE Transactions on Circuits and Systems for Video Technology, Vol. 5, No. 6, December 1995.

Most of these techniques first segment the video into shots using low-level features extracted from individual frames. Then, the shots are grouped into scenes using the extracted features. Based on this extraction and grouping, these techniques usually build a hierarchical structure of the video content.

The problem with these approaches is that they are not flexible. Thus, it is difficult to do a detailed analysis to bridge the gap between low-level features and high-level features, such as semantic events. Moreover, too much information is lost during the segmentation process.

Therefore, it is desired to provide a system and apparatus that can extract high-level features from a video without first segmenting the video into shots.

SUMMARY OF THE INVENTION

It is an object of the invention to provide automatic content analysis using frame-based, low-level features. The invention, first extracts features at the frame level and then labels each frame based on each of the extracted features. For example, if three features are used, color, motion, and audio, each frame has at least three labels, i.e., color, motion, and audio labels.

This reduces the video to multiple sequences of labels, there being one sequence of labels for feature common among consecutive frames. The multiple label sequences retain considerable information, while simultaneously reducing the video into a simple form. It should be apparent to those of ordinary skill in the art, that the amount of data required to code the labels is orders of magnitude less than the data that encodes the video itself. This simple form enables machine learning techniques such as Hidden Markov Models (HMM), Bayesian Networks, Decision Trees, and the like, to perform high-level feature extraction.

The procedures according to the invention, offer a way to combine low-level features that performs well. The high-level feature extraction system according to the invention provides an open framework that enables easy integration with new features. Furthermore, the invention can be integrated with traditional methods of video analysis. The invented system provides functionalities at different granularities that can be applied to applications with different requirements. The invention also provides a system for flexible browsing or visualization using individual low-level features or their combinations. Finally, the feature extraction according to the invention can be performed in the compressed domain for fast, and preferably real-time, system performance. Note that the extraction need not necessarily be in the compressed domain, even though the compressed domain extraction is preferred.

More particularly, the invention provides a system an method for extracting high-level features from a video including a sequence of frames. Low-level features are extracted from each frame of the video. Each frame of the video is labeled according to the extracted low-level features to generate sequences of labels. Each sequence of labels is associated with one of the extracted low-level feature. The sequences of labels are analyzed using learning machine learning techniques to extract high-level features of the video.

DETAILED DESCRIPTION OF PREFERRED EMBODIMENTS

System Structure

Figure 1:
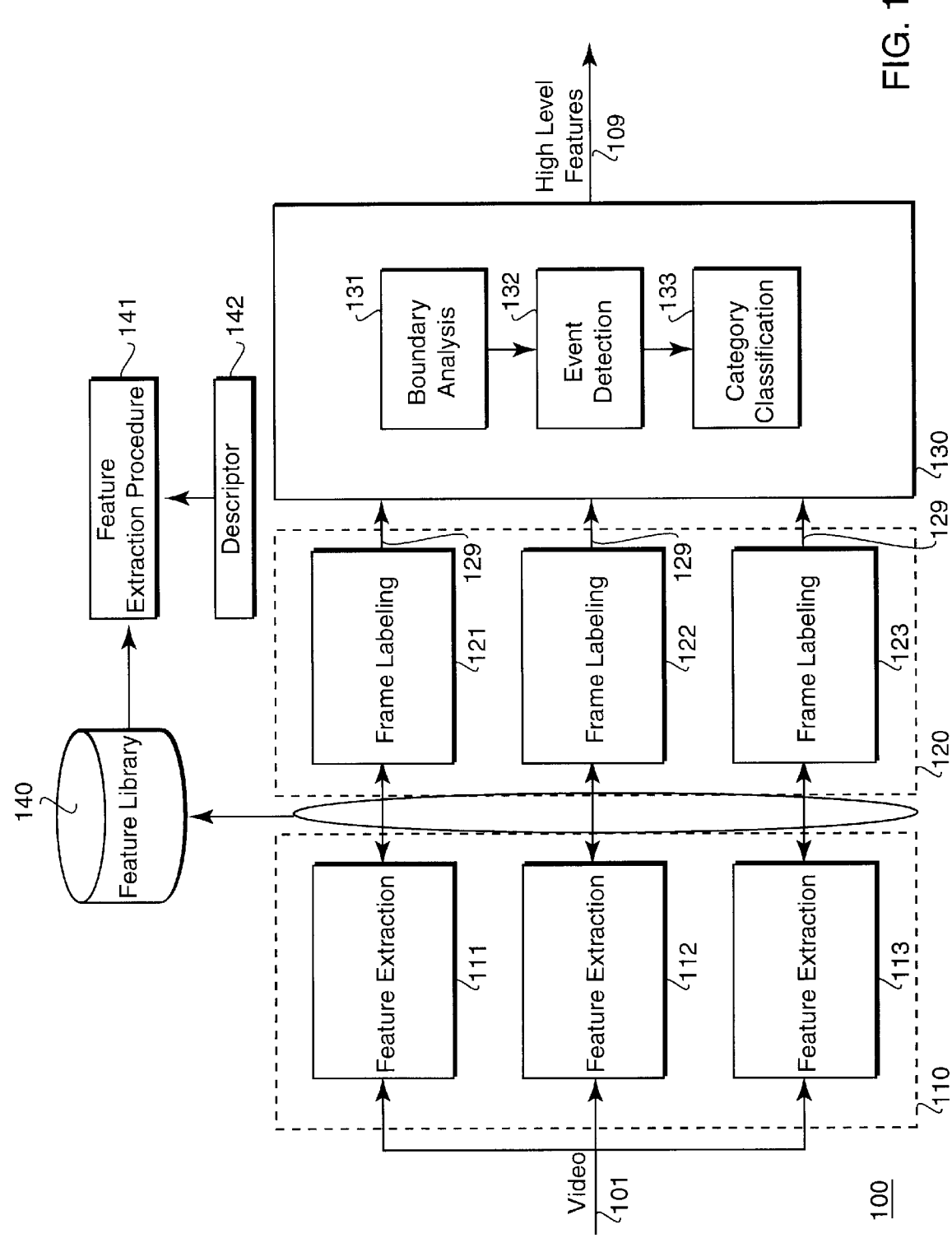
FIG. 1 is a block diagram of a feature extraction system according to the invention.

FIG. 1 shows a system 100 for extracting low-level and high-level features from a video according to the invention. The system 100 includes a feature extraction stage 110, a frame labeling stage 120, and an analysis stage (analyzer) 130. The system also includes a feature library 140.

The first stage 110 includes one ore more feature extraction blocks (extractors) 111–113. The second stage 120 includes one or more frame labeling blocks (labelers) 121–123. The third stage 130 includes a boundary analysis block 131, an event detection block 132, and a category classification block 133.

The input 101 to the system is a video 101, i.e., a sequence of frames. Preferably, the video 101 is compressed, however, features extracted in the uncompressed domain can be integrated when necessary. The output 109 includes high-level features or events 109.

System Operation

The features extraction blocks 111–113 extract low-level features from the video. The features are extracted using feature extraction procedures 141 stored in the feature library 140. With each extraction procedure there is a corresponding descriptor 142. The blocks 121–123 of the second stage 120 label the frames of the video on the basis of the extracted features. The labels can be the descriptors 142. One frame might be labeled according to multiple different low-features features, as described in detail below. The output from the second stage is label sequences 129. The third stage integrates the label sequence to derive the high-level features or semantics (events) 109 of the content of the video 101.

Feature Extraction

Color Features

The DC coefficients of I frame can be extracted accurately and easily. For P and B frames, the DC coefficients can also be approximated using motion vectors without full decompression, see, for example, Yeo et al. "*On the Extraction of DC Sequence from MPEG video,*" IEEE ICIP Vol. 2, 1995. The YUV value of the DC image can be transformed to different color space and used to get color features.

The most popular used feature is the color histogram. It has been widely used in image and video indexing and retrieval, see Smith et al "*Automated Image Retrieval Using Color and Texture,*" IEEE Transaction on Pattern Analysis and Machine Intelligence, November 1996. Here, we use the RGB color space. We use four bins for each channel, thus using 64 (4×4×4) bins in all for the color histogram.

Motion Features

The motion information is mostly embedded in motion vectors. The motion vectors can be extracted from P and B frames. Because motion vectors are usually a crude and sparse approximation to real optical flow, we only use motion vectors qualitatively. Many different methods to use motion vectors have been proposed, see Tan et al. "*A new method for camera motion parameter estimation,*" Proc. IEEE International Conference on Image Processing, Vol. 2, pp. 722–726, 1995, Tan et al. "*Rapid estimation of camera motion from compressed video with application to video annotation,*" to appear in IEEE Trans. on Circuits and Systems for Video Technology, 1999, Kobla et al. "*Detection of slow-motion replay sequences for identifying sports videos,*" Proc. IEEE Workshop on Multimedia Signal Processing, 1999, Kobla et al. "*Special effect edit detection using VideoTrails: a comparison with existing techniques,*" Proc. SPIE Conference on Storage and Retrieval for Image and Video Databases VII, 1999, Kobla et al., "*Compressed domain video indexing techniques using DCT and motion vector information in MPEG video,*" Proc. SPIE Conference on Storage and Retrieval for Image and Video Databases V, SPIE Vol. 3022, pp. 200–211, 1997, and Meng et al. "*CVEPS—a compressed video editing and parsing system,*" Proc. ACM Multimedia 96, 1996.

We use the motion vectors to estimate global motion. A six parameter affine model of camera motion is used to classify the frames into pan, zoom and still, i.e., no cameral motion. We can also use a motion direction histogram to estimate pan, and use focus of contraction and expansion (FOE, and FOC) of the motion vectors to estimate zoom.

Audio Features

Audio features have a strong correlation to video features and have been proved to be very helpful to do segmentation together with video features, see Sundaram et al, "*Video Scene Segmentation Using Video and Audio Features,*" ICME 2000, and Sundaram et al. "*Audio Scene Segmentation Using Multiple Features, Models and Time Scales,*" ICASSP 2000. Ten different features of audio can be used: cepstral flux, multi-channel cochlear decomposition, cepstral vectors, low energy fraction, zero crossing rate, spectral flux, energy, spectral roll off point, variance of zero crossing rate, and variance of the energy.

Frame Labeling

For a given feature, e.g., color, we use "on-the-fly" dynamic clustering to accordingly label each frame. The inter-frame distance of the feature is traced and compared with the current average inter-frame distance of the set of frames from a last cluster change. When the new inter-frame distance is greater than a predetermined threshold, a new set of frame labels starts.

The centroid of the set of frames is compared with registered clusters. If the set of frames is substantially close to the current cluster, it is assigned to this cluster, and the centroid of the cluster is updated. Otherwise, a new cluster is generated.

When the new inter-frame distance is small, it is added to the current set of continuous frames, and the average of the inter-frame distance is updated. During the clustering, each frame is labeled according to the cluster of its feature. We repeat this procedure for each individual feature, thus getting multiple label sequences 129 for the video.

Multiple Label Streams Integration

Our high-level semantic (event) analysis in stage 130 is based on the analysis of the multiple label sequences 129.

Event Boundary Analysis

Each label sequence 129 indicates how the frames are assigned a particular label. A boundary between cluster of labels in a particular label sequence indicate a change in the content as reflected by this feature in some aspect. For example, a sequence of motion labels will have a boundary where the motion transitions from static to fast.

Different features may label the video into different clusters of labels. That is, unlike the prior art, the cluster boundaries of the various label sequences are not necessarily time aligned. By comparing the boundaries of different adjacent label sequences, we can refine the clustering of the video into sequences of labels, and also determine the semantic meanings of the alignment and misalignment of the boundaries of different clusters of labels.

Figure 2:
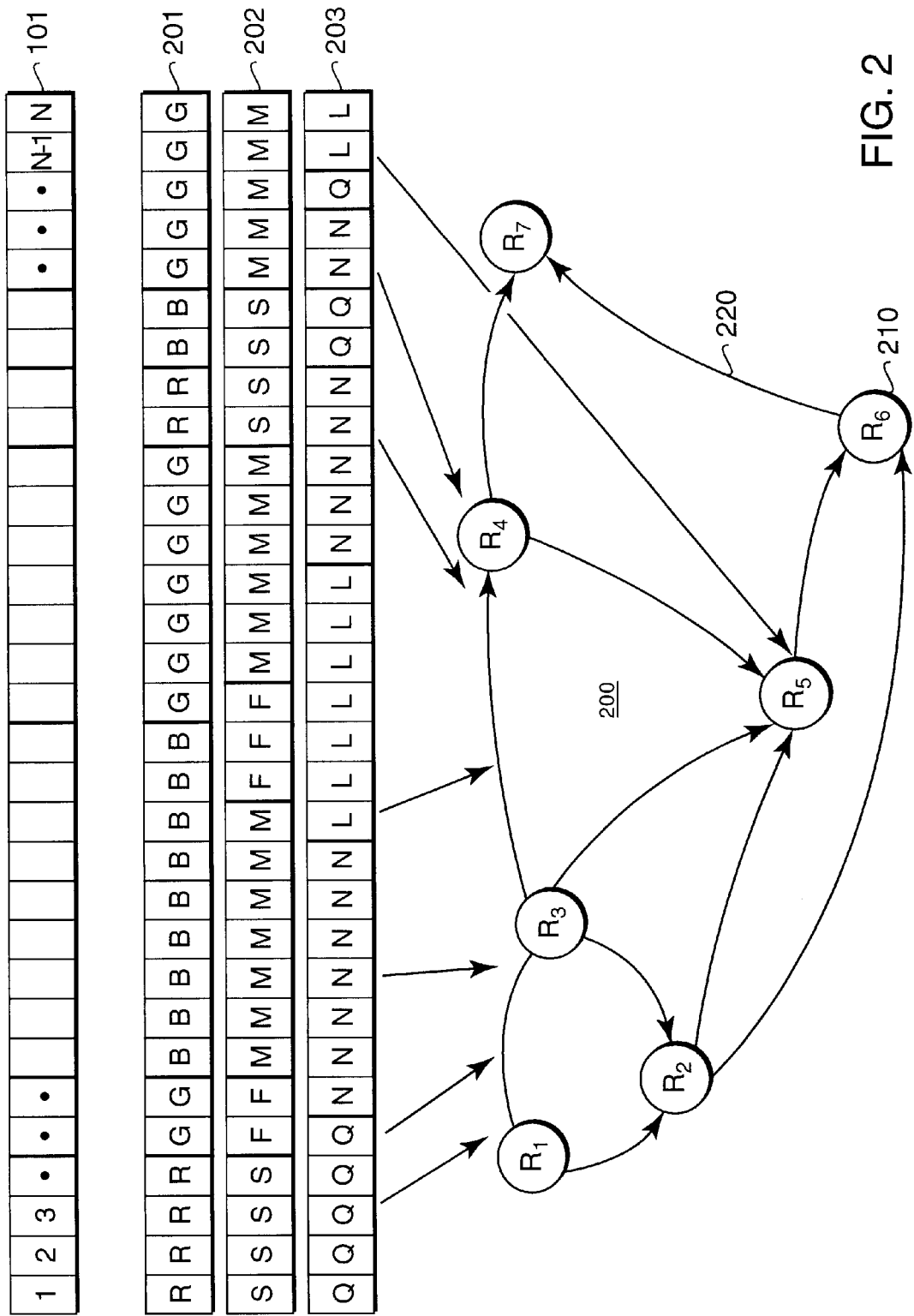
FIG. 2 is a block diagram of multiple label sequences, and a trained event model.

FIG. 2 shows a sequence of frames (1–N) 101, and three labels sequences 201, 202, and 203. The label values (Red, Green, and Blue) of the sequence 201 are based on color features, the label values, Medium, and Fast) of the sequence 202 are based on motion features, and the label values (Noisy, Loud) of the sequence 203 are audio features. Note that in this example, the boundaries of clusters of labels are not always time aligned. The manner in which the labeling coincides or transitions can be indicate of different semantic meanings. For example, when there is a long pan, there might be an apparent scene change during the panning so that the color changes but motion does not. Also when an object in the scene changes motion suddenly, there may be motion change without color change. Similarly, the audio labels can remain constant while the color labels change. For example, in a football video, slow motion followed by fast motion on a green field, followed by a pan of a flesh colored scene accompanied by loud noise can be classified as a "scoring" event.

Note, our clustering according to sequences of labels is quite different than the prior art segmentation of a video into shots. Our clusters are according different labels, the boundaries of clusters with different labels may not be time aligned. This is not case in traditional video segmentation. We analyze not only label boundaries per se, but also the time aligned relationship among the various labels, and the transitional relations of the labels.

Event Detection

One way to detect events is to first generate a state transition graph 200, or Hidden Markov Model (HMM). The HMN is generated from the label sequences 201–203. In the graph 200, each node 210 represent probabilities of various events ($e_1, \ldots, e_7$) and the edges 220 represent statistical dependencies (probabilities of transitions) between the events. The HMM can then be trained with known label sequences of a training video. The trained HMM can then be used to detect events in a new video.

Transitions in multiple label sequences can be coupled in the HMM model see, Naphade et al. *"Probabilistic Multimedia Object (Multijects): A Novel approach to Video Indexing and Retrieval in Multimedia Systems,"* ICIP 98, and Kristjansson et al., *"Event-coupled Hidden Markov Models,"* ICME 2000, where HMMs are used in other video related applications. We use unsupervised learning methods to detect repetitive, significant, or abnormal patterns in the label sequences 201–203. Combined with domain knowledge, we can build relations between known event patterns and semantic meanings.

Category Classification

At the same time, the output of the category classification and boundary analysis blocks can be used to "supervise" automatic event detection. Video classification can be very useful to provide the basic category of the video content so that methods more specific to videos in the category can further be applied. Frame-based multiple features enable videos classification.

A classifier is built based on the statistical analysis of different labels. For example, in a news video, we locate particular color labels with much higher occurrences. These labels correspond typically to the anchor person, and can be used to distinguish news videos from other videos. In football videos, we locate very frequent changes of motion labels because the camera tracks the unpredictable motion of the ball. In baseball videos, we locate the repetition of transitions between several different color labels, which correspond to the common views of the playground, e.g., the windup, the pitch, the hit, and the run to first base. All this information, in combination, helps us classify video content.

Although the invention has been described by way of examples of preferred embodiments, it is to be understood that various other adaptations and modifications may be made within the spirit and scope of the invention. Therefore, it is the object of the appended claims to cover all such variations and modifications as come within the true spirit and scope of the invention.

We claim:

1. A method for extracting high-level features from a video including a sequence of frames, comprising:

extracting a plurality of low-level features from each frame of the video;

labeling each frame of the video according to the extracted low-level features to generate a plurality of sequences of labels, each sequence of labels associated with one of the plurality of extracted low-level features; and analyzing the plurality of sequences of labels to extract high-level features of the video.

2. The method of claim 1 wherein the video is compressed.

3. The method of claim 1 further comprising:

storing a feature extraction method in a memory, there being one feature extraction method for each of the plurality of low-level features to be extracted from the video; and storing a corresponding descriptor for each low-level feature with each associated feature extraction method.

4. The method of claim 1 wherein the frames are labeled according to the descriptors.

5. The method of claim 1 wherein the low-level features include color features, motion features, and audio features.

6. The method of claim 1 further comprising:

tracing an inter-frame distance of each low-level feature;

comparing the inter-frame distance with a current average inter-frame distance; and if the inter-frame distance is greater than a predetermined threshold, starting a new cluster of labels.

7. The method of claim 6 further comprising:

updating the average inter-frame distance while tracing the inter-frame distance of each frame.

8. The method of claim 1 further comprising:

grouping labels having identical values into clusters.

9. The method of claim 1 further comprising:

generating state transition graph from the sequences of labels;

training the state transition graph with training sequences of labels of training videos; and detecting high-level features of the video using the trained state transition graph.

10. The method of claim 1 wherein the analyzing depends on boundaries between low-level features.

11. A system for extracting high-level features from a video including a sequence of frames, comprising:

a plurality feature extractors configured to extract a plurality of low-level features from the video, there being one feature extractor for each feature;

a plurality of frame labelers configured to label frames of the video according to the corresponding extracted low-level features;

an analyzer configured to analyze the sequences of labels to extract high-level features of the video.

12. The method of claim 1 further comprising:

classifying the sequences of labels.

13. A method for extracting high-level features from a video including a sequence of frames, comprising:

extracting a plurality of low-level features from each frame of the video;

labeling each frame of the video according to the extracted low-level features to generate a plurality of sequences of labels, each sequence of labels associated with one of the plurality of extracted low-level feature;

analyzing the plurality of sequences of labels to extract high-level features of the video;

tracing an inter-frame distance of each low-level feature;

comparing the inter-frame distance with a current average inter-frame distance; and if the inter-frame distance is greater than a predetermined threshold, starting a new cluster of labels.

* * * * *